(12) United States Patent
Ma

(10) Patent No.: US 10,132,407 B2
(45) Date of Patent: Nov. 20, 2018

(54) METHOD OF ADJUSTING A GEAR LEVER NEUTRAL POSITION

(71) Applicant: Ford Global Technologies, LLC, Dearborn, MI (US)

(72) Inventor: Thomas Ma, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/636,403

(22) Filed: Jun. 28, 2017

(65) Prior Publication Data

US 2018/0003297 A1 Jan. 4, 2018

(30) Foreign Application Priority Data

Jul. 4, 2016 (GB) .................................. 1611588.3

(51) Int. Cl.

| F16H 61/18 | (2006.01) |
| F16H 59/44 | (2006.01) |
| F16H 59/54 | (2006.01) |
| F16H 59/02 | (2006.01) |
| F16H 59/04 | (2006.01) |
| F16H 59/18 | (2006.01) |
| F16H 61/24 | (2006.01) |

(52) U.S. Cl.
CPC .......... *F16H 61/18* (2013.01); *F16H 59/0217* (2013.01); *F16H 59/04* (2013.01); *F16H 59/18* (2013.01); *F16H 59/44* (2013.01); *F16H 59/54* (2013.01); *F16H 61/24* (2013.01); *F16H 2059/0295* (2013.01); *F16H 2061/241* (2013.01)

(58) Field of Classification Search
None
See application file for complete search history.

(56) References Cited

U.S. PATENT DOCUMENTS

| 4,543,842 A | 10/1985 | Katayama |
| 5,560,253 A | 10/1996 | Ishikawa et al. |
| 5,911,787 A * | 6/1999 | Walker .................. F16H 61/702 701/51 |
| 6,145,398 A * | 11/2000 | Bansbach ........... F16H 61/2807 477/76 |

(Continued)

FOREIGN PATENT DOCUMENTS

| EP | 1267240 A1 | 12/2002 |
| EP | 2112408 A1 | 10/2009 |

(Continued)

OTHER PUBLICATIONS

Combined Search and Examination Report under Sections 17 and 18(3) in corresponding international application No. GB1611588.3 dated Dec. 22, 2016, 6 pages.

(Continued)

*Primary Examiner* — Justin Holmes
(74) *Attorney, Agent, or Firm* — James Dottavio; Brooks Kushman P.C.

(57) ABSTRACT

A vehicle includes a gear shifter operable to shift a manual transmission. An actuator is connected to the shifter and actuatable to bias the shifter to at least a first or second neutral position. The vehicle further includes a controller configured to bias the shifter, via the actuator, to one of the neutral positions based on a speed of the vehicle.

16 Claims, 6 Drawing Sheets

(56) References Cited

U.S. PATENT DOCUMENTS

| | | | |
|---|---|---|---|
| 2006/0236799 A1* | 10/2006 | Hedman | ............... F16H 61/18 74/335 |
| 2006/0236800 A1 | 10/2006 | Yone et al. | |
| 2011/0005344 A1 | 1/2011 | Haevescher | |
| 2014/0069221 A1* | 3/2014 | Ishida | ................ F16H 63/34 74/473.22 |
| 2014/0373661 A1 | 12/2014 | Benson et al. | |
| 2015/0198238 A1 | 7/2015 | Smith et al. | |

FOREIGN PATENT DOCUMENTS

| | | | |
|---|---|---|---|
| EP | 2587096 A | | 5/2013 |
| EP | 2792910 A2 | | 10/2014 |
| JP | H02180371 A | | 7/1990 |
| JP | 2007045297 A | | 2/2007 |

OTHER PUBLICATIONS

European Search Report for Application No. 17275082, dated Nov. 7, 2017, 8 pages.
British Examination Report for British Application No. GB1611588. 3, dated Oct. 1, 2018, 4 pages.

\* cited by examiner

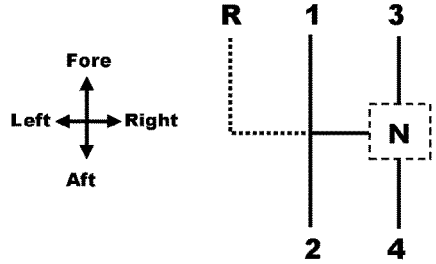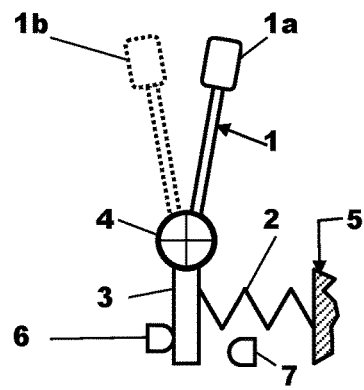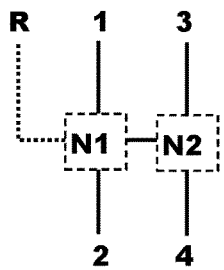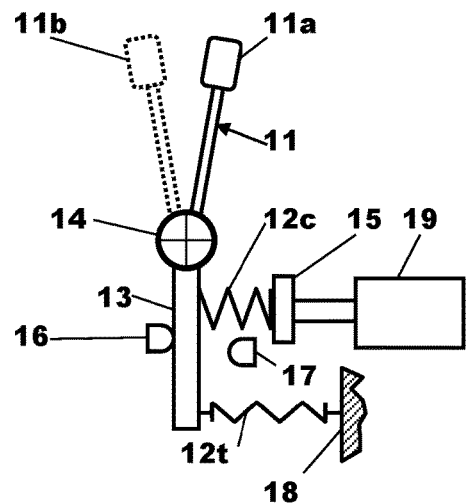
Fig. 1
Fig. 2
PRIOR ART
Fig. 3
Fig. 4

METHOD OF ADJUSTING A GEAR LEVER NEUTRAL POSITION

CROSS-REFERENCE TO RELATED APPLICATIONS

This application claims foreign priority benefits under 35 U.S.C. § 119(a)-(d) to GB Application 1611588.3 filed Jul. 4, 2016, which is hereby incorporated by reference in its entirety.

TECHNICAL FIELD

This invention relates to a manual gear shift and in particular to a method of adjusting a notional neutral position of a gear lever forming part of a manual gear shift.

BACKGROUND

It is well known to provide a gear shift having a gear lever for effecting a manual gear change of a multi-speed transmission. Examples of such gear shifts are known from, for example U.S. Pat. Nos. 4,543,842, 5,560,253; European Patent Publication 1267240 and US Patent Publication 2015/0198238.

Such gear shifts include a spring based biasing means to position the gear lever into a preferred neutral position.

FIGS. 1 and 2 show in a diagrammatic manner one example of such a spring biased neutral gear shift.

In FIG. 1 a plan view is shown in which it can be seen that there are four forward gears arranged in an "H" pattern. First and second gear selected or engaged positions f1 and f2 are arranged so as to lie in a first plane and third and fourth gear selected positions f3 and f4 are arranged to lie in a second plane offset from the first plane. The first and second planes are arranged to extend in a Fore-Aft direction of a motor vehicle to which the gear shift is fitted.

A transverse neutral plane joins the first and second planes and in this case is arranged at right angle to the first and second planes and extends in a Left-Right transverse direction of the motor vehicle.

A reverse gear "R" is selectable by movement of the gear lever into a gate lying on a sub-plane arranged parallel to but offset from the first plane.

In FIG. 2 a gear lever 1 is shown at 1a positioned in the transverse neutral plane in a neutral position so as to align the gear lever 1 with the second plane and is shown in dotted outline at 1b in the transverse plane aligned with the first plane.

Conventionally the gear lever 1 is biased so as to align it with the second plane by one or more springs indicated diagrammatically by the coil spring 2 acting between a fixed abutment 5 and an arm 3 extending from a pivot member 4 from which the gear lever 1 extends. The pivot member 4 allows the gear lever 1 to move in a fore-aft direction as well as a left-right direction so as to permit the various gears to be engaged.

When the gear lever 1 is positioned in the transverse neutral plane with no external load applied it will automatically adopt the position 1a shown in FIG. 2 and "N" in FIG. 1 due to the effect of the coil spring which urges the arm 3 into abutment with a stop 6. Therefore when changing between third and fourth gears no left or right load needs to be applied by a driver of the vehicle.

However, when it is required to move from the second plane to the first plane such as, for example, when changing from third gear to second gear then the driver is required to apply a force to the gear lever against the action of the spring 2 to traverse along the transverse neutral plane in order to reach the first plane. A further stop 7 is provided to limit the leftward transverse motion of the gear lever 1 so as to provide good alignment of the gear lever 1 with the first plane. It will be appreciated that the stop 7 is moveable to as to permit reverse gear to the selected.

Although such an arrangement is useable when only four forward gear ratios are available for selection it is less satisfactory when more than four ratios are provided. If, for example six forward gear ratios are selectable then some drivers find it difficult to select the correct ratio if a fixed neutral position is used irrespective of the plane with which the gear lever is biased to align with when in the transverse neutral plane.

SUMMARY

It is an object of this invention to provide a method of automatically adjusting a gear lever neutral position so as to provide easier forward gear selection.

According to a first aspect of the invention there is provided a method of adjusting a neutral position of a motor vehicle gear lever forming part of a manual gear shift mechanism having a number of forward gear selected positions arranged in pairs on parallel planes linked via a common transverse neutral plane, the gear lever having a neutral position when in the transverse neutral plane the position of which is adjusted by an actuator acting on the gear lever via a compressible connection characterised in that the method comprises using the actuator to adjust the position of the neutral position in the transverse neutral plane based upon a current vehicle speed.

The method may further comprise comparing a current vehicle speed with at least one vehicle speed threshold and adjusting the position of the gear lever neutral position in the transverse neutral plane is based upon the result of the comparison.

The at least one vehicle speed threshold may be a predefined vehicle speed threshold.

There may be a first plane containing first and second gear selected positions, a second plane containing third and fourth gear selected positions and a first vehicle speed threshold and the method may comprise adjusting the position of neutral in the neutral plane to align neutral with the first plane if the current vehicle speed is less than the first vehicle speed threshold and to align neutral with the second plane if the current vehicle speed is greater than the first vehicle speed threshold.

Alternatively, there may be a first plane containing first and second gear selected positions, a second plane containing third and fourth gear selected positions, a third plane containing fifth and sixth gear selected positions, a first vehicle speed threshold and a second vehicle speed threshold set higher than the first vehicle speed threshold and the method may comprise adjusting the position of neutral in the neutral plane to align neutral with the first plane if the current vehicle speed is less than the first vehicle speed threshold, to align neutral with the second plane if the current vehicle speed is greater than the first vehicle speed threshold but less than the second vehicle speed threshold and to align neutral with the third plane if the current vehicle speed is greater than the second vehicle speed threshold.

As yet a further alternative, there may be a first plane containing first and second gear selected positions, a second plane containing third and fourth gear selected positions, a third plane containing fifth and sixth gear selected positions, a fourth plane containing seventh and eighth gear selected positions, a first vehicle speed threshold set lower than a second vehicle speed threshold and a third vehicle speed threshold set higher than the second vehicle speed threshold and the method may comprise adjusting the position of neutral in the neutral plane to align neutral with the first plane if the current vehicle speed is less than the first vehicle speed threshold, to align neutral with the second plane if the current vehicle speed is greater than the first vehicle speed threshold but less than the second vehicle speed threshold, to align neutral with the third plane if the current vehicle speed is greater than the second vehicle speed threshold but less than the third vehicle speed threshold and to align neutral with the fourth plane if the current vehicle speed is greater than the third vehicle speed threshold.

The method may further comprise adjusting the position of neutral in the transverse neutral plane based upon a currently engaged gear and a position of an accelerator pedal.

If the currently engaged gear is the higher of two forward gears in the current plane the position of neutral may be moved to a plane containing the next higher gear provided such a gear exists and the current speed is above a predefined speed threshold if the accelerator pedal is being pressed and is kept in the current plane if the accelerator pedal is not being pressed.

If the currently engaged gear is the lower of two forward gears in the current plane, the position of neutral may be moved to a plane containing the next lower gear provided such a gear exists and the current speed is below a predefined speed threshold if the accelerator pedal is not being pressed and is kept in the current plane if the accelerator pedal is being pressed.

The method may further comprise adjusting the position of neutral in the transverse neutral plane based upon a currently engaged gear and a position of a brake pedal.

If the currently engaged gear is the lower of two forward gears in the current plane, the position of neutral may be moved to a plane containing the next lower gear provided such a gear exists and the current speed is below a predefined speed threshold if the brake pedal is being pressed and is kept in the current plane if the brake pedal is not being pressed.

According to a second aspect of the invention there is provided a gear lever neutral position adjustment system comprising a gear lever forming part of a manual gear shift mechanism having a number of forward gear selected positions arranged in pairs on parallel planes linked via a common transverse neutral plane, at least one actuator acting on the gear lever via a compressible connection to adjust a neutral position of the gear lever when the gear lever is in the transverse neutral plane and an electronic controller to control the operation of the actuator characterised in that the electronic controller is arranged to adjust the position of the neutral position in the transverse neutral plane based upon a current vehicle speed.

The electronic controller may be further arranged to compare a current vehicle speed with at least one vehicle speed threshold and use the at least one actuator to adjust the position of the gear lever neutral position in the transverse neutral plane based upon the result of the comparison.

The electronic controller may be further arranged to use the at least one actuator to adjust the position of neutral in the transverse neutral plane based upon a currently engaged gear and at least one of a position of an accelerator pedal and a position of a brake pedal.

According to a third aspect of the invention there is provided a motor vehicle having a multi-speed gearbox the selection of gears within which is made by a manual gear shift mechanism having a gear lever and a gear lever neutral position adjustment system constructed in accordance with said second aspect of the invention.

The invention will now be described by way of example with reference to the accompanying drawing of which:

BRIEF DESCRIPTION OF THE DRAWINGS

FIG. 1 is a diagrammatic plan view of a conventional H-gate manual gear shift arrangement;

FIG. 2 is a diagrammatic side view of the gear shift arrangement shown in FIG. 1;

FIG. 3 is a diagrammatic plan view of an H-gate manual gear shift arrangement in accordance with this invention;

FIG. 4 is a diagrammatic side view of the gear shift arrangement shown in FIG. 3;

DETAILED DESCRIPTION

Figure 5:
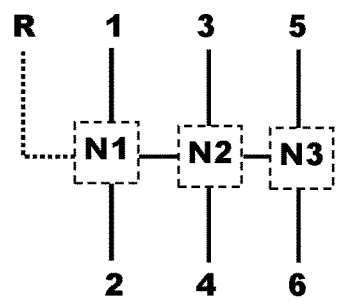
FIG. 5 is a diagrammatic plan view of a double H gate manual gear shift arrangement showing three possible gear lever neutral positions in accordance with the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With particular reference to FIGS. 3 and 4 there is shown an H gear shift providing four forward gears and one reverse gear in accordance with this invention.

First and second gear selected positions f1 and f2 are arranged so as to lie in a first engaged gear plane and third and fourth gear selected positions f3 and f4 are arranged to lie in a second engaged gear plane offset to the right from the first plane. The first and second engaged gear planes extend in a Fore-Aft direction of a motor vehicle to which the gear shift is fitted.

A transverse neutral plane joins the first and second planes and in this case is arranged at a right angle to the first and second planes and extends in a Left-Right transverse direction of the motor vehicle. When a gear lever 11 is positioned in the transverse neutral plane a gearbox, the selection of gears within which is controlled by movement of the gear lever, is said to be in 'neutral' and no drive is transmittable by the gearbox.

A reverse gear selected position "R" is selectable by movement of the gear lever 11 into a gate lying on a sub-plane arranged parallel to but offset to the left from the first plane.

The part of the first and second planes forward from the transverse plane form respectively first and third gear gates and the part of the first and second planes rearward of the transverse plane form respectively second and fourth gear gates.

Two notional neutral positions N1 and N2 are shown in FIG. 3.

The notional neutral position N1 is aligned with the first plane (1-2 plane) and the notional neutral position N2 is aligned with the second plane (3-4 plane).

The notional positions N1 and N2 are the positions that the gear lever 11 (shown in FIG. 4) will adopt when in the transverse neutral plane with no external force applied by the driver of the motor vehicle. The positions are actual neutral positions when the gear lever 11 is in the transverse neutral plane but are desired neutral positions when the gear lever 11 is in an 'in gear' or engaged position hence the use of the term "notional".

As will be described hereinafter the notional neutral position is adjusted in accordance with this invention based upon operation of the motor vehicle and, in particular, the velocity or forward speed of the motor vehicle.

FIG. 4 shows a diagrammatic side view of a first embodiment of a manual gear shift lever neutral adjusting mechanism for the gear shift arrangement shown in FIG. 3 showing at position 11a a gear lever 11 aligned with the second plane corresponding to the N2 position indicated on FIG. 3.

The mechanism comprises the gear lever 11 that is rotatably supported by a pivot member 14 and an arm 13 connected to the lever 11 via the pivot member 14. It will be appreciated that the pivot member 14 is rotatably supported by a housing or other structure not shown.

First and second springs 12c, 12t act upon the arm 13 in opposing directions so that the position of the arm 13 and hence the rotational position of the gear lever 11 is dependant upon a force balance acting on the arm 13.

The first spring 12c is a compression spring and is interposed between the arm 13 and a moveable abutment 15 the position of which is controlled by a linear actuator 19.

The second spring 12t is a tension spring interposed between the arm 13 and a fixed abutment 18.

When the position of the moveable abutment 15 is as shown in FIG. 4 the gear lever 11 adopts the position indicated by the reference 11a which aligns the gear lever 11 with the second plane including the third and fourth gear gates.

If the moveable abutment 15 is moved to the right by the actuator 19 then the effect is to reduce the force in the first spring 12c and, due to the rotational mounting of the arm 13 will cause the arm 13 to rotate in a counter-clockwise direction until the force resulting from the extension of the second spring 12t balances the force produced by the first spring 12c. In FIG. 4 this new balance position is shown as gear lever position 11b corresponding to the first plane that includes the first and second gear gates. A stop 17 is provided to assist with accurate alignment of the gear lever 11 with the first plane. It will be appreciated that the stop 17 is selectively releasable by a driver of the motor vehicle to permit the selection of reverse gear "R".

If the moveable abutment 15 is then moved back to the left by the actuator 19 then the effect is to increase the force in the first spring 12c and, due to the rotational mounting of the arm 13 will cause the arm 13 to rotate in a clockwise direction until the force resulting from the compression of the first spring 12c balances the force produced by the second spring 12t and the gear lever 11 returns to the position 11a.

The position of the gear lever 11 therefore mimics the motion of the moveable abutment 15 but it will be appreciated that when the gear lever 11 is in the transverse neutral plane it can be moved by the driver from position N1 to position N2 if the neutral position has been set to N1 or from N2 to N1 if the neutral position has been set to N2 by applying a load to the gear lever 11 in the required direction.

It will be appreciated that the spring forces acting on the arm 13 balance each other while the arm 13 is spaced away from the stops 16, 17 but are arranged to be slightly out of balance when the arm 13 is in contact with one of the stops 16, 17. When the arm 13 is in contact with the stop 16 the force acting from the first spring 12c will be slightly more than that from the second spring 12t and when the arm 13 is in contact with the stop 17 the force acting from spring 12t will be slightly more than that from the spring 12c.

Therefore by controlling the actuator 19 to move the moveable abutment 15, the neutral position when the gear lever 11 is in the transverse neutral plane or a notional neutral position when the gear lever 11 is in a gear engaged position can be adjusted.

Figure 6A:
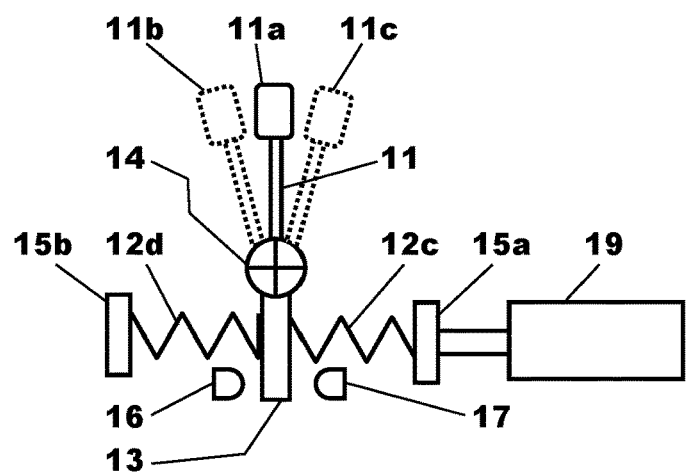
FIG. 6A is a diagrammatic side view of a first embodiment of a manual gear shift lever neutral adjusting mechanism for the gear shift arrangement shown in FIG. 3 in accordance with the invention.
Figure 6B:
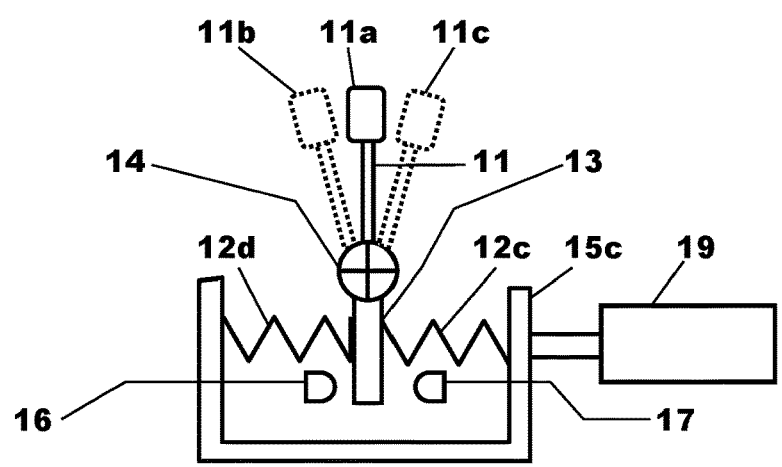
FIG. 6B is a diagrammatic side view of a second embodiment of a manual gear shift lever neutral adjusting mechanism for the gear shift arrangement shown in FIG. 3 in accordance with the invention.

With particular reference to FIGS. 5, 6A and 6B there is shown a double H gear shift providing six forward gears and one reverse gear.

First and second gear selected positions f1 and f2 are arranged so as to lie in a first plane, third and fourth gear selected positions f3 and f4 are arranged to lie in a second plane offset to the right from the first plane and fifth and sixth gear selected positions f5 and f6 are arranged to lie on a third plane offset to the right from the second plane. The first, second and third planes extend in a Fore-Aft direction of a motor vehicle to which the gear shift is fitted.

A transverse neutral plane joins the first, second and third planes and in this case is arranged at a right angle to the first, second and third planes and extends in a Left-Right transverse direction of the motor vehicle.

As before reverse gear selected position "R" is selectable by movement of a gear lever 11 into a gate lying on a sub-plane arranged parallel to but offset to the left from the first plane.

The part of the first, second and third planes forward from the transverse neutral plane form respectively first, third and fifth gear gates and the part of the first, second and third planes rearward of the transverse neutral plane form respectively second, fourth and sixth gear gates.

Three notional neutral positions N1, N2 and N3 are shown in FIG. 5.

The notional neutral position N1 is aligned with the first plane (1-2 plane), the notional neutral position N2 is aligned with the second plane (3-4 plane) and the notional neutral position N3 is aligned with the third plane (5-6 plane). The notional positions N1, N2 and N3 are the positions that a gear lever 11 (shown in FIGS. 6A and 6B) will adopt when in the transverse neutral plane with no external force applied by the driver of the motor vehicle. The positions are actual neutral positions when the gear lever 11 is in the transverse neutral plane but are desired neutral positions when the gear lever 11 is in a gear engaged position hence the use of the term "notional".

FIG. 6A shows a diagrammatic side view of a second embodiment of a manual gear shift lever neutral adjusting mechanism as applied to the gear shift arrangement shown in FIG. 5. In FIG. 6A the gear lever 11 is shown at position 11a aligned with the second plane corresponding to the N2 position indicated on FIG. 5.

The mechanism is similar to that previously described with respect to FIG. 4 with the exception that the second spring is in this case a compression spring 12d interposed between a fixed abutment 15b and the arm 13 and so is not described again in detail. As before the first and second springs 12c, 12d act upon the arm 13 in opposing directions so that the position of the arm 13 and hence the rotational position of the gear lever 11 is dependant upon a force balance acting on the arm 13.

When the position of the moveable abutment 15 is as shown in FIG. 6A the gear lever 11 adopts the position indicated by the reference 11a which aligns the gear lever 11 with the second plane including the third and fourth gates.

If the moveable abutment 15a is moved to the right by the actuator 19 then the effect is to reduce the force in the first spring 12c and, due to the rotational mounting of the arm 13 will cause the arm 13 to rotate in a counter-clockwise direction until the force resulting from the extension of the second spring 12d balances the force produced by the first spring 12c.

In FIG. 6A this new balance position is shown as gear lever position 11b corresponding to the first plane that includes the first and second gear gates. As before a removable stop 17 is provided to assist with accurate alignment of the gear lever 11 with the first plane.

Conversely, if the moveable abutment 15a is moved from the position shown in FIG. 6A to the left by the actuator 19 then the effect is to increase the force in the first spring 12c and, due to the rotational mounting of the arm 13 will cause the arm 13 to rotate in a clockwise direction until the force resulting from the compression of the second spring 12d balances the force produced by the first spring 12c. In FIG. 6A this new balance position is shown as gear lever position 11c corresponding to the third plane that includes the fifth and sixth gear gates. As before a stop 16 is provided to assist with accurate alignment of the gear lever 11 with the third plane.

The position of the gear lever 11 therefore mimics the motion of the moveable abutment 15a but it will be appreciated that when the gear lever 11 is in the transverse neutral plane it can be moved by the driver from position N1 to position N2 or from N1 to N3 if the neutral position has been set to N1 or from N2 to N1 or N2 to N3 if the neutral position has been set to N2 or from N3 to N1 or from N3 to N2 if the neutral position has been set to N3 by applying a load to the gear lever 11 in the required direction.

Therefore by controlling the actuator 19 to move the moveable abutment 15a the notional neutral position can be adjusted.

In FIG. 6B there is shown a diagrammatic side view of a third embodiment of a manual gear shift lever neutral adjusting mechanism as applied to the gear shift arrangement shown in FIG. 5 that is in most respects the same as that previously described with reference to FIG. 6A and so will not be described again in detail.

The third embodiment differs from that shown in FIG. 6A in that instead of a fixed abutment 15b and a moveable abutment 15a a single common moveable abutment 15c is used.

With such an embodiment the forces produced by the first and second compression springs 12c and 12d remain the same unless the driver applied a force to the gear lever 11.

The position of the gear lever 11 as before mimics the position of the moveable abutment 15c that is to say, when the moveable abutment 15c is moved by the actuator 19 to the right from the second plane position 11a shown in FIG. 6B the gear lever 11 adopts the position 11b aligned with the first plane and when the moveable abutment 15c is moved by the actuator 19 to the left from the second plane position 11a shown in FIG. 6B the gear lever 11 adopts the position 11c aligned with the third plane.

As before, when the gear lever 11 is in the transverse neutral plane it can be moved by the driver from position N1 to position N2 or N1 to N3 if the neutral position has been set to N1 or from N2 to N1 or N2 to N3 if the neutral position has been set to N2 or from N3 to N1 or N3 to N2 if the neutral position has been set to N3 by applying a load to the gear lever 11 in the required direction.

Figure 7:
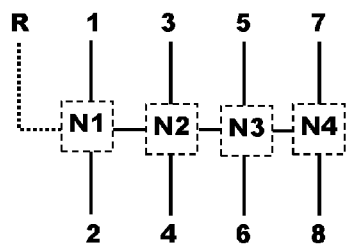
FIG. 7 is a diagrammatic plan view of a triple H gate manual gear shift arrangement showing four possible gear lever neutral positions in accordance with the invention.

With particular reference to FIG. 7 there is shown a triple H gear shift providing eight forward gears and one reverse gear.

First and second gear selected positions f1 and f2 are arranged so as to lie in a first plane, third and fourth gear selected positions f3 and f4 are arranged to lie in a second plane offset to the right from the first plane, fifth and sixth gear selected positions f5 and f6 are arranged to lie on a third plane offset to the right from the second plane and seventh and eighth gear selected positions f7 and f8 are arranged to lie on a fourth plane offset to the right from the third plane. The first, second, third and fourth planes extend in a Fore-Aft direction of a motor vehicle to which the gear shift is fitted.

A transverse neutral plane joins the first, second, third and fourth planes and in this case is arranged at a right angle to the first, second, third and fourth planes and extends in a Left-Right transverse direction of the motor vehicle.

As before a reverse gear selected position "R" is selectable by movement of the gear lever 11 into a gate lying on a sub-plane arranged parallel to but offset to the left from the first plane.

The part of the first, second, third and fourth planes forward from the transverse neutral plane form respectively first, third, fifth and seventh gear gates and the part of the first, second, third and fourth planes rearward of the transverse neutral plane form respectively second, fourth, sixth and eighth gear gates.

Four notional neutral positions N1, N2, N3 and N4 are shown in FIG. 7.

The notional neutral position N1 is aligned with the first plane (1-2 plane), the notional neutral position N2 is aligned with the second plane (3-4 plane), the notional neutral position N3 is aligned with the third plane (5-6 plane) and the notional neutral position N4 is aligned with the fourth plane (7-8 plane). The notional positions N1, N2, N3 and N4 are the positions that a gear lever such as the gear lever 11 (shown in FIGS. 4, 6A and 6B) will adopt when in the transverse neutral plane with no external force applied by the driver of the motor vehicle. The positions are actual neutral positions when the gear lever 11 is in the transverse neutral plane but are desired neutral positions when the gear lever 11 is in a gear engaged position hence the use of the term "notional".

As before, the mechanism used to move the notion neutral position is of a configuration that permits the gear lever when it is in the transverse neutral plane to be moved by the driver from position N1 to positions N2, N3 or N4 if the neutral position has been set to N1 or from N2 to N1, N3 or N4 if the neutral position has been set to N2 or from N3 to N1, N2 or N4 if the neutral position has been set to N3 or from N4 to N1, N2 or N3 if the neutral position has been set to N4 by the driver applying a load to the gear lever in the required direction to produce the required motion. To achieve this result the gear lever neutral adjusting mechanism includes one or more springs interposed between one or more actuators and the gear lever.

Although the invention has been previously described with respect to three possible neutral adjusting mechanisms it will be appreciated that it is not limited to the specific mechanisms described which are provided by way of example.

Figure 8:
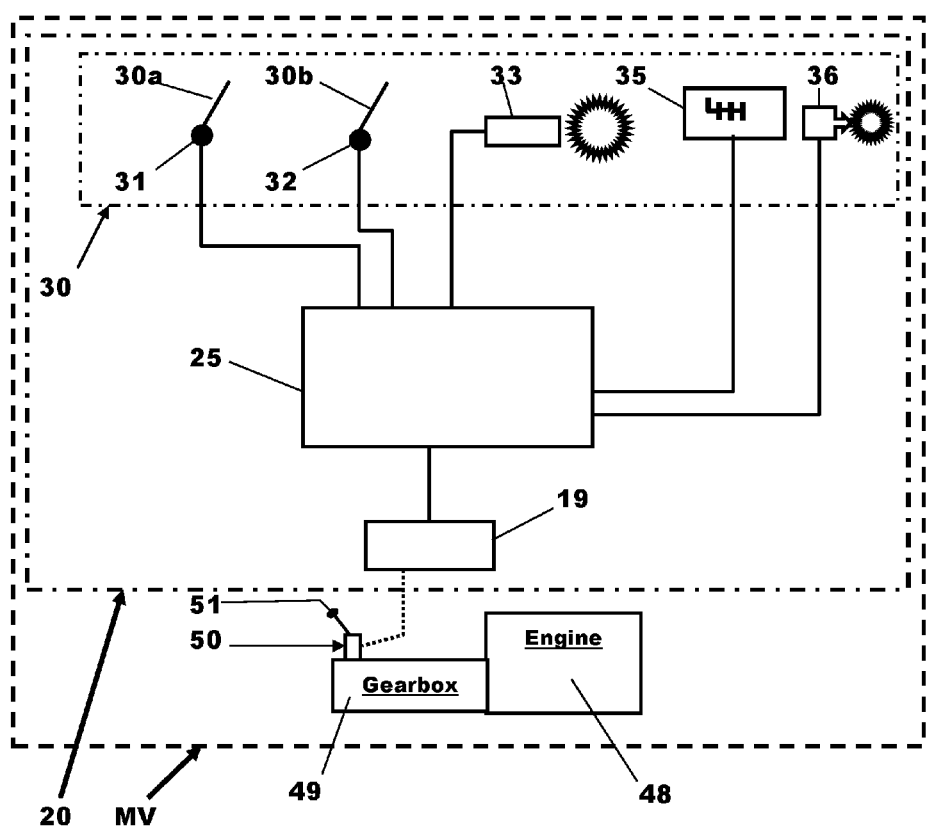
FIG. 8 is a schematic diagram of a motor vehicle having a gear lever neutral position adjustment system in accordance with the invention.

With reference to FIG. 8 the is shown a motor vehicle MV having a gear lever neutral position adjustment system 20 in accordance with the invention for use in controlling the operation of a neutral adjusting mechanism such as the mechanisms shown in FIGS. 4, 6A and 6B. The motor vehicle MV includes an engine 48 driving a multi-speed gearbox 49 the selection of gears within which is made by a manual gear shift mechanism 50 including the gear lever 11.

The neutral position adjustment system 20 comprises an electronic controller 25 having a number of inputs 30 and is arranged to control an actuator 19 used to adjust the position of a gear lever notional neutral position such as the notional neutral positions N1, N2, N3 and N4 previously discussed.

In the case of this example the inputs 30 comprise a signal from an accelerator pedal position sensor 31 provided to sense the position of an accelerator pedal 30a, a signal from a brake pedal position sensor 32 provided to sense the position of a brake pedal 30b, a signal from a vehicle speed sensor 33 provided to sense the velocity or speed of the motor vehicle MV of which the system 20 forms a part.

In a first embodiment of the neutral position adjustment system 20 configured for use with the H gate arrangement shown in FIG. 3 to adjust the position of the notional neutral position based upon whether the speed of the motor vehicle MV is greater or less than a first predefined vehicle speed threshold v1. In this embodiment, if the current speed of the motor vehicle MV is less than the first predefined vehicle speed threshold v1 as sensed by the vehicle speed sensor 33, the electronic controller 25 is arranged to control the actuator 19 to move the notional neutral position to the position N1 shown on FIG. 3 corresponding to the first plane. If the current speed of the motor vehicle MV is greater than the first predefined vehicle speed threshold v1 as sensed by the vehicle speed sensor 33, the electronic controller 25 is arranged to control the actuator 19 to move the notional neutral position to the position N2 shown on FIG. 3 corresponding to the second plane.

With such an arrangement in most cases the driver only has to move the gear lever 11 in a forward or rearward direction because the neutral position is pre-aligned with a predicted required plane.

In the case where the currently selected gear is second and the current vehicle speed 'V' exceeds the first predefined vehicle speed threshold v1, the electronic controller 25 will use the actuator 19 to move the notional neutral position to N2 ready for a change into third or fourth gear.

In the case where the currently selected gear is third gear or fourth gear and the current vehicle velocity is less than the first predefined vehicle speed threshold v1, the electronic controller 25 will move the notional neutral position to N1 ready for a change into second or first gear.

It will be appreciated that the vehicle speed could be inferred from engine speed if an engaged gear sensor such as the engaged gear sensor 35 provided as one of the inputs 30. Using the signal from the engaged gear sensor 35 and current engine speed as sensed by an engine speed sensor 36 a value for current vehicle speed can be calculated.

The value of the first predefined vehicle speed threshold v1 will depend upon the gear ratios used for a particular vehicle but is likely to be in most cases circa 30 kph.

In some embodiments the position of the accelerator pedal 30a and the brake pedal 30b can be used to supplement the vehicle speed comparison. For example if the vehicle speed is greater than the first predefined vehicle speed threshold v1 while first or second gear is engaged but the accelerator pedal 30a has been released and/or the brake pedal 30b is being pressed then the neutral position N1 can be selected by the electronic controller 25.

Similarly, if the vehicle speed is less than the first predefined vehicle speed threshold v1 while third or fourth gear is engaged and the accelerator pedal 30a is being pressed then the neutral position N2 can be selected by the electronic controller 25.

That is to say, in some embodiments the motor vehicle parameter chosen to decide which neutral position to select can be based solely on vehicle speed and in other embodiments one or more additional vehicle operating parameters such accelerator position or brake pedal position can be combined with vehicle speed to produce the decision.

In a second embodiment of the neutral position adjustment system 20 configured for use with the double H gate arrangement shown in FIG. 5 to adjust the position of the notional neutral position based upon whether the speed of the motor vehicle MV is greater or less than respective first and second predefined vehicle speed thresholds v1 and v2.

In this embodiment:

a/ if the current speed 'V' of the motor vehicle MV is less than the first predefined vehicle speed threshold v1 as sensed by the vehicle speed sensor 33, the electronic controller 25 is arranged to control the actuator 19 to move the notional neutral position to the position N1 shown on FIG. 5 corresponding to the first plane;

b/ if the current speed of the motor vehicle MV is greater than the first predefined vehicle speed threshold v1 as sensed by the vehicle speed sensor 33 but less than the second predefined vehicle speed threshold v2, the electronic controller 25 is arranged to control the actuator 19 to move the notional neutral position to the position N2 shown on FIG. 5 corresponding to the second plane; and c/ if the current speed of the motor vehicle MV is greater than the second predefined vehicle speed threshold v2 as sensed by the vehicle speed sensor 33, the electronic controller 25 is arranged to control the actuator 19 to move the notional neutral position to the position N3 shown on FIG. 5 corresponding to the third plane.

Therefore with such an arrangement in most cases the driver only has to move the gear lever 11 in a forward or rearward direction because the neutral position is pre-aligned with a predicted required plane.

As before other vehicle parameters could be combined with the vehicle speed to refine the decision as to where to position the notional neutral position.

In a third embodiment of the neutral position adjustment system 20 configured for use with the triple H gate arrangement shown in FIG. 7 to adjust the position of the notional neutral position based upon whether the speed of the motor vehicle MV is greater or less than first, second and third vehicle speed thresholds v1, v2 and v3.

In this embodiment:

a/ if the current speed 'V' of the motor vehicle MV is less than the first predefined vehicle speed threshold v1 as sensed by the vehicle speed sensor 33, the electronic controller 25 is arranged to control the actuator 19 to move the notional neutral position to the position N1 shown on FIG. 7 corresponding to the first plane;

b/ if the current speed of the motor vehicle MV is greater than the first predefined vehicle speed threshold v1 as sensed by the vehicle speed sensor 33 but less than the second predefined vehicle speed threshold v2, the electronic controller 25 is arranged to control the actuator 19 to move the notional neutral position to the position N2 shown on FIG. 7 corresponding to the second plane;

c/ if the current speed of the motor vehicle MV is greater than the second predefined vehicle speed threshold v2 as sensed by the vehicle speed sensor 33 but less than the third predefined vehicle speed threshold v3, the electronic controller 25 is arranged to control the actuator 19 to move the notional neutral position to the position N3 shown on FIG. 7 corresponding to the third plane; and d/ if the current speed of the motor vehicle MV is greater than the third predefined vehicle speed threshold v3 as sensed by the vehicle speed sensor 33, the electronic controller 25 is arranged to control the actuator 19 to move the notional neutral position to the position N4 shown on FIG. 7 corresponding to the fourth plane.

Therefore with such an arrangement in most cases the driver only has to move the gear lever in a forward or rearward direction because the neutral position is pre-aligned with a predicted required plane.

As before other vehicle parameters could be combined with the vehicle speed to refine the decision as to where to position the notional neutral position.

Although as previously described each transition is based upon a single vehicle speed threshold it will be appreciated that two thresholds could be provided for each transition. For example with reference to the gear arrangement shown in FIG. 3, when in the second plane the notional neutral position is moved from N2 to N1 when the vehicle speed (velocity V) is less than the speed threshold v1 but a transition from the first plane to the second plane (N1 to N2) will not occur until the vehicle speed is greater than a speed threshold v1' which is set higher than v1.

It will also be appreciated that the adjustment of the neutral position could be decided based upon an algorithm such as for example:

Neutral Position=Function of Vehicle Speed, Accelerator Pedal Position, Brake Pedal Position and Currently engaged Gear. With such arrangement predefined fixed vehicle speed thresholds need not be used.

Figure 9:
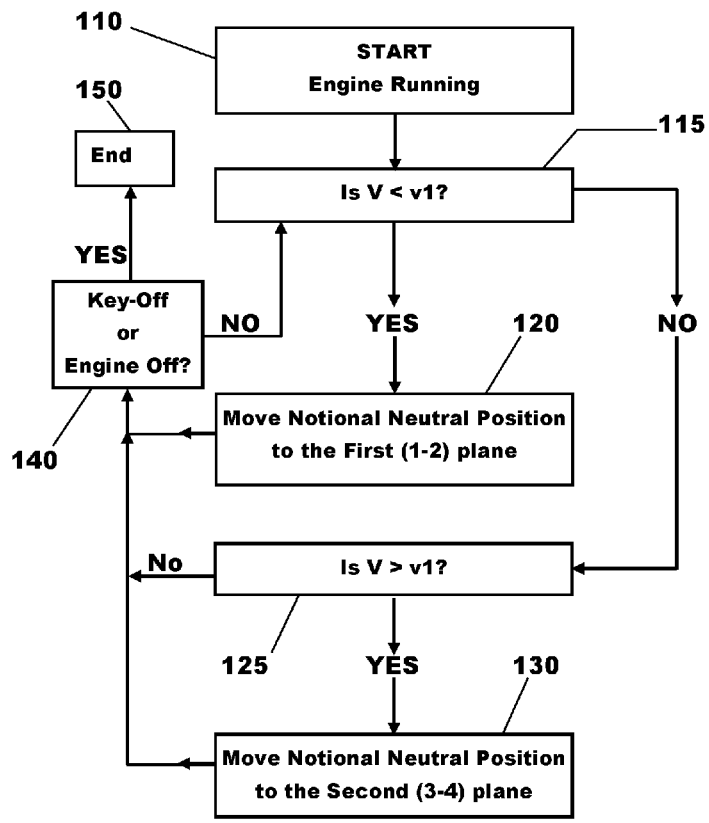
FIG. 9 is a high level flow chart of a method of adjusting a gear lever neutral position in accordance with the invention as applied to the H gate manual gear shift arrangement shown in FIGS. 3 and 4.

With reference to FIG. 9 there is shown a first embodiment of a method of adjusting a gear lever neutral position for an H gear selector arrangement as shown in FIG. 3.

The method starts at box 110 where an engine of a motor vehicle such as the motor vehicle MV is running and then advances to box 115 to check whether the current speed "V" of the motor vehicle is less than a first predefined vehicle speed threshold v1. If V is less than the first predefined vehicle speed threshold v1 the method advances to box 120 otherwise it advances to box 125.

In box 120 the notional position of the neutral position is moved or kept so as to be with a first plane of the gear selector mechanism containing first and second gear gates and so is positioned as shown by the reference N1 on FIG. 3.

After executing the step of box 120 the method advances to box 140 where it is checked whether the engine is no longer running or whether a Key-off event has occurred and, if either of these events has occurred, the method ends at box 150 otherwise it returns to box 115 and will continue so long as the result of the test in box 140 results in a 'NO' outcome.

Referring back to box 115 if the current vehicle speed V is not less than the first predefined vehicle speed threshold v1 then the method advances from box 115 to box 125.

In box 125 it is checked whether the current vehicle speed V is greater than the first predefined vehicle speed threshold v1. If the current vehicle speed V is greater than the first predefined vehicle speed threshold v1 when checked in box 125 the method advances to box 130 and the notional position of the neutral position is moved or kept so as to be depending upon its current location with a second plane of the gear selector mechanism containing third and fourth gear gates and so is positioned as shown by the reference N2 on FIG. 3.

From box 130 the method advances to box 140 where it is checked whether the engine is no longer running or whether a Key-off event has occurred and, if either of these events has occurred, the method ends at box 150 otherwise it returns to box 115 and will continue so long as the result of the test in box 140 results in a 'NO' outcome.

Referring back to box 125, if current vehicle speed V is not greater than the predefined vehicle speed threshold v1 when checked in box 125 the method advances to box 140 where it is checked whether the engine is no longer running or whether a Key-off event has occurred and, if either of these events has occurred, the method ends at box 150 otherwise it returns to box 115 and will continue so long as the result of the check in box 140 indicates that the engine is still running and a Key-off event has not occurred.

Figure 10:
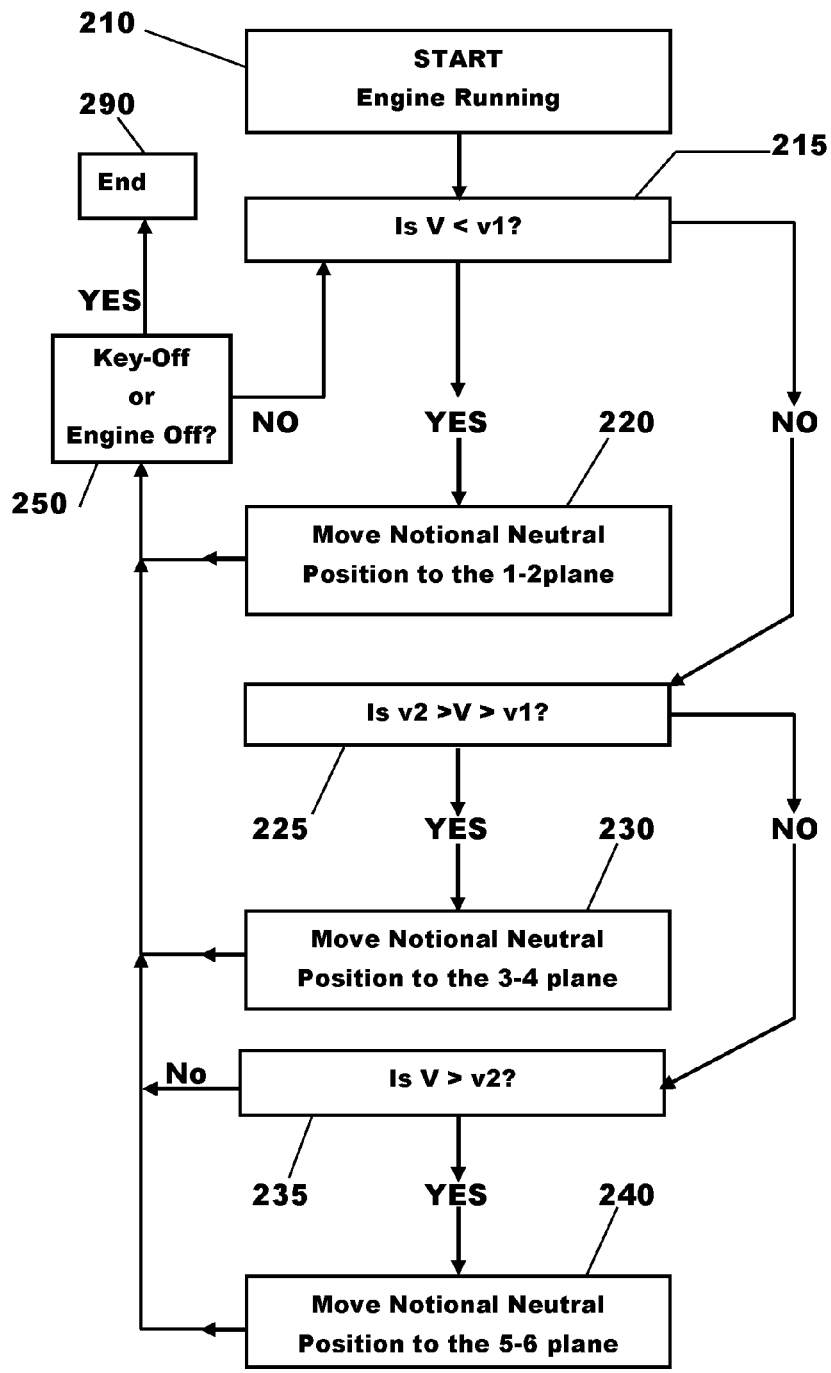
FIG. 10 is a high level flow chart of a method of adjusting a gear lever neutral position in accordance with the invention as applied to the double H gate manual gear shift arrangement shown in FIGS. 5 to 6B.

With reference to FIG. 10 there is shown a second embodiment of a method of adjusting a gear lever neutral position for a double H gear selector arrangement as shown in FIG. 5.

The method starts at box 210 where an engine of a motor vehicle such as the motor vehicle MV is running and then advances to box 215 to check whether the current speed "V" of the motor vehicle is less than a first predefined vehicle speed threshold v1. If the vehicle speed V is less than the first predefined vehicle speed threshold v1 the method advances to box 220 otherwise it advances to box 225.

In box 220 the notional position of the neutral position is moved or kept, depending upon its current location, aligned with a first plane of the gear selector mechanism containing first and second gear gates and so is positioned as shown by the reference N1 on FIG. 5.

After executing the step of box 220 the method advances to box 250 where it is checked whether the engine is no longer running or whether a Key-off event has occurred and, if either of these events has occurred, the method ends at box 290 otherwise it returns to box 215 and will continue so long as the result of the test in box 250 results in a 'NO' outcome indicating that the engine is still running.

Referring back to box 215 if the current vehicle speed V is greater than the first predefined vehicle speed threshold v1 then the method advances from box 215 to box 225.

In box 225 it is checked whether the current vehicle speed V is greater than the first predefined vehicle speed threshold v1 but less than a second predefined vehicle speed threshold v2 that is set higher than the first predefined vehicle speed threshold v1.

If the current vehicle speed V is greater than the first predefined vehicle speed threshold v1 but less than the second predefined vehicle speed threshold v2 when checked in box 225 the method advances to box 230 and the notional position of the neutral position is moved or kept so as to be with a second plane of the gear selector mechanism containing third and fourth gear gates and so is positioned as shown by the reference N2 on FIG. 5.

From box 230 the method advances to box 250 where it is checked whether the engine is no longer running or whether a Key-off event has occurred and, if either of these events has occurred, the method ends at box 290 otherwise it returns to box 215 and will continue so long as the result of the test in box 250 results in a 'NO' outcome.

Referring back to box 225, if the current vehicle speed V is less than the first predefined vehicle speed threshold v1 or more than the second predefined vehicle speed threshold v2 when checked in box 225 the method advances to box 235.

In box 235 it is checked whether the current vehicle speed V is greater than the second predefined vehicle speed threshold v2 and if not the method advances to box 250 where it is checked whether the engine is no longer running or whether a Key-off event has occurred and, if either of these events has occurred, the method ends at box 290 otherwise it returns to box 215 and will continue so long as the result of the check in box 250 indicates that the engine is still running and a Key-off event has not occurred.

Returning to box 235, if the current vehicle speed V is greater than the second predefined vehicle speed threshold v2, the method advances to box 240 where the notional neutral position is moved or kept so as to be with a third plane of the gear selector mechanism containing fifth and sixth gear gates and so is positioned as shown by the reference N3 on FIG. 5.

From box 240 the method advances to box 250 where it is checked whether the engine is no longer running or whether a Key-off event has occurred and, if either of these events has occurred, the method ends at box 290 otherwise it returns to box 215 and will continue so long as the result of the test in box 250 results in a 'NO' outcome.

Figure 11:
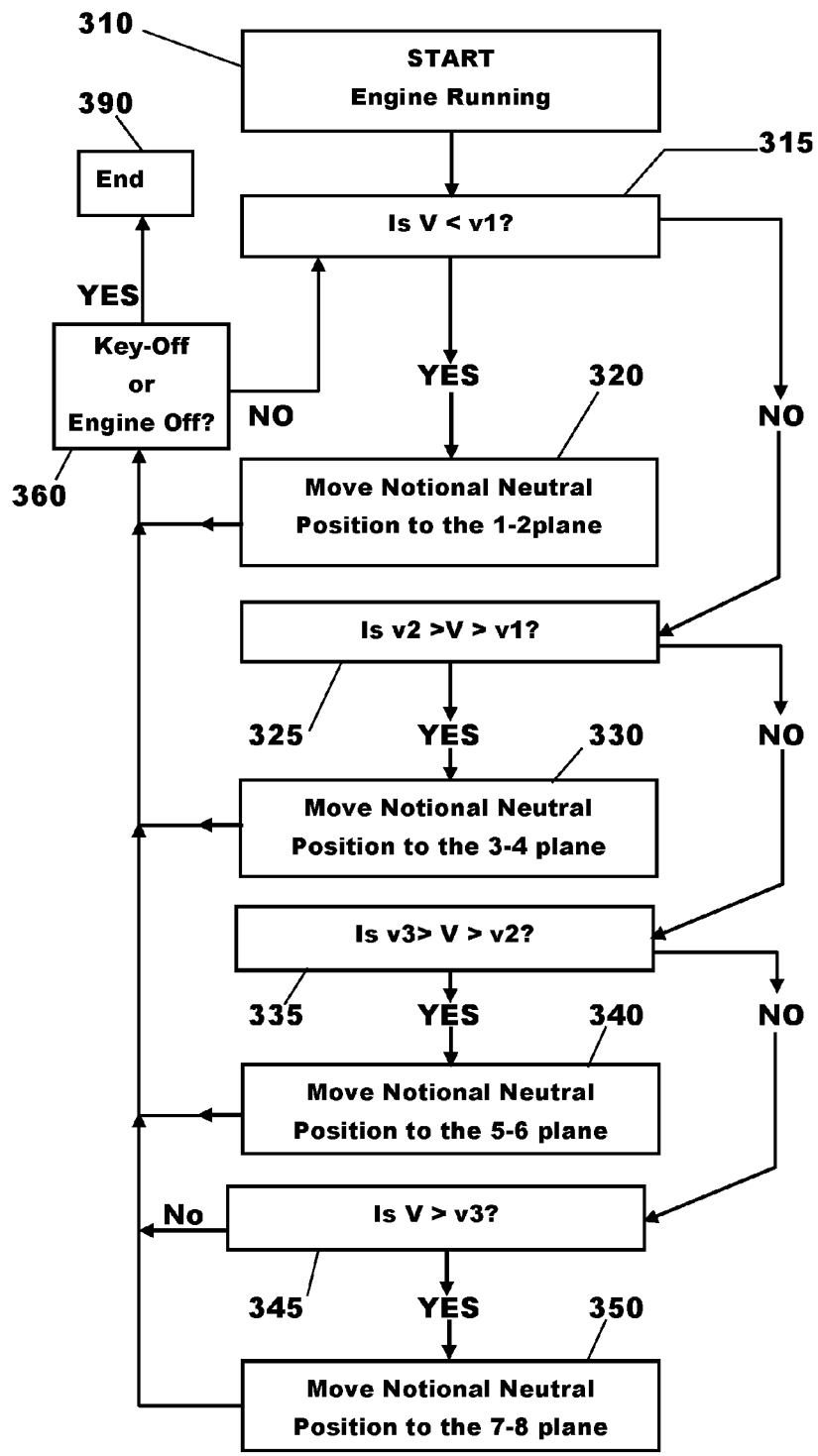
FIG. 11 is a high level flow chart of a method of adjusting a gear lever neutral position in accordance with the invention as applied to the triple H gate manual gear shift arrangement shown in FIG. 7.

Referring now to FIG. 11 there is shown a third embodiment of a method of adjusting a gear lever neutral position for a triple H gear selector arrangement as shown in FIG. 7.

The method starts at box 310 where an engine of a motor vehicle such as the motor vehicle MV is running and then advances to box 315 to check whether the current speed "V" of the motor vehicle is less than a first predefined speed threshold v1. If V is less than the first predefined vehicle speed threshold v1 the method advances to box 320 otherwise it advances to box 325.

In box 320 the notional position of the neutral position is moved or kept, depending upon its current location, so as to be aligned with a first plane of the gear selector mechanism containing first and second gear gates and so is positioned as shown by the reference N1 on FIG. 7.

After executing the step of box 320 the method advances to box 360 where it is checked whether the engine is no longer running or whether a Key-off event has occurred and, if either of these events has occurred, the method ends at box 390 otherwise it returns to box 315 and will continue so long as the result of the test in box 360 results in a 'NO' outcome indicating that the engine is still running.

Referring back to box 315 if the current vehicle speed V is greater than the first predefined vehicle speed threshold v1 then the method advances from box 315 to box 325.

In box 325 it is checked whether the current vehicle speed V is greater than the first predefined vehicle speed threshold v1 but less than a second predefined vehicle speed threshold v2 that is set higher than the first predefined vehicle speed threshold v1.

If when checked in box 325 the current vehicle speed V is greater than the first predefined vehicle speed threshold v1 but less than the second predefined vehicle speed threshold v2 the method advances to box 330 and the notional position of the neutral position is moved or kept so as to be aligned with a second plane of the gear selector mechanism containing third and fourth gear gates and so is positioned as shown by the reference N2 on FIG. 7.

From box 330 the method advances to box 360 where it is checked whether the engine is no longer running or whether a Key-off event has occurred and, if either of these events has occurred, the method ends at box 390 otherwise it returns to box 315 and will continue so long as the result of the test in box 360 results in a 'NO' outcome.

Referring back to box 325, if the current vehicle speed V is less than the first predefined vehicle speed threshold v1 or more than the second predefined vehicle speed threshold v2 when checked in box 325 the method advances to box 335.

In box 335 it is checked whether the current vehicle speed V is greater than the second predefined vehicle speed threshold v2 but less than a third predefined vehicle speed threshold v3 that is set higher than the first and second predefined threshold speeds v1 and v2.

If when checked in box 335 the current vehicle speed V is greater than the second predefined vehicle speed threshold v2 but less than the third predefined vehicle speed threshold v3 the method advances to box 340 and the notional position of the neutral position is moved or kept so as to be aligned with a third plane of the gear selector mechanism containing fifth and sixth gear gates and so is positioned as shown by the reference N3 on FIG. 7.

From box 340 the method advances to box 360 where it is checked whether the engine is no longer running or whether a Key-off event has occurred and, if either of these events has occurred, the method ends at box 390 otherwise it returns to box 315 and will continue so long as the result of the test in box 360 results in a 'NO' outcome.

Referring back to box 335, if the current vehicle speed V is less than the second predefined vehicle speed threshold v2 or more than the third predefined vehicle speed threshold v3, the method advances from box 335 to box 345.

In box 345 it is checked whether the current vehicle speed V is greater than the third predefined vehicle speed threshold v3 and if not the method advances to box 360 where it is checked whether the engine is no longer running or whether a Key-off event has occurred and, if either of these events has occurred, the method ends at box 390 otherwise it returns to box 315 and will continue so long as the result of the check in box 360 indicates that the engine is still running and a Key-off event has not occurred.

Returning to box 345, if the current vehicle speed V is greater than the third predefined vehicle speed threshold v3, the method advances to box 350 where the notional neutral position is moved or kept so as to be aligned with a fourth plane of the gear selector mechanism containing seventh and eighth gear gates and so is positioned as shown by the reference N4 on FIG. 7.

From box 350 the method advances to box 360 where it is checked whether the engine is no longer running or whether a Key-off event has occurred and, if either of these events has occurred, the method ends at box 390 otherwise it returns to box 315 and will continue so long as the result of the test in box 360 results in a 'NO' outcome indicating that the engine is still running and there has not been a Key-off event.

It will be appreciated that in the case of the three embodiments of methods of adjusting a gear lever neutral position as shown in FIGS. 9 to 11 a single speed threshold is used irrespective of whether the vehicle is accelerating or decelerating. However, as previously referred to, different speed thresholds could be used for an accelerating vehicle compared to one that is decelerating and FIGS. 12a and 12b illustrate one example of how such an approach can be applied to the second embodiment of the method shown in FIG. 10.

Figure 12A:
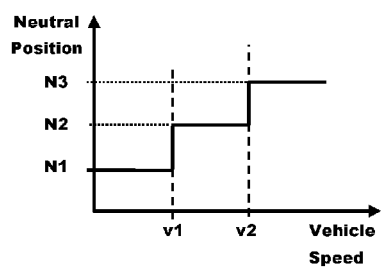
FIGS. 12A and 12B are graphs showing the relationship between vehicle speed and neutral position for cases where the motor vehicle is accelerating and decelerating respectively.
Figure 12B:
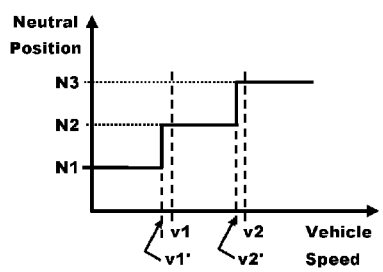

In FIG. 12A the changes in neutral position are shown for an accelerating vehicle that is to say one in which the forward speed is increasing and in FIG. 12B the changes in neutral position are shown for a decelerating vehicle in which the forward speed is decreasing. For the accelerating case the change points are when the speed thresholds v1 and v2 are crossed but for the decelerating case the change in neutral position is a until further speed thresholds v1' and v2' that are lower than the first and second speed thresholds v1 and v2 are crossed.

Although the decision on where to position the notional neutral position is based primarily on a comparison of a current vehicle speed with a predefined vehicle threshold and so requires no knowledge of the currently engaged gear it will be appreciated that other approaches can be used if knowledge of a currently engaged gear is available.

For example, the current vehicle speed can be combined with information regarding the current gear, the position of an accelerator pedal and/or the position of a brake pedal.

For example as applied to FIG. 10, if the vehicle is currently in third gear then the result from box 215 could be modified by using the test If V<v1 and either accelerator is not being pressed or brake pedal is being pressed then go to box 220 otherwise go to box 230.

Similarly, if the vehicle is currently in fourth gear then the result from box 235 could be modified by using the test If V>v2 and the accelerator is being pressed then go to box 240 otherwise go to box 230.

The overall effect of the invention is that a driver gets the sensation or perception that the gear selector mechanism is anticipating their intention and leading their hand in the direction they want requiring little or no extra effort.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a gear box including at least first, second, third, and fourth forward gear ratios;
   a gear shift mechanism including
      a gear shifter operable to shift the gear box between the gear ratios and including first, second, third, and fourth positions corresponding with the gear box being in the first, second, third, and fourth forward gear ratios, the shifter including a movement path having a first parallel plane extending between the first and second positions, a second parallel plane extending between the third and fourth positions, and a transverse plane extending between first and second parallel planes,
      a biasing mechanism including a resilient member and a movable abutment, the biasing mechanism being configured to urge the gear shifter to a first neutral position located at the intersection of the first parallel plane and the transverse plane when the abutment is in a first position and to urge the gear shifter to a second neutral position located at the intersection of the second parallel plane and the transverse plane when the abutment is in a second position, and
      an actuator operable to adjust the abutment between the first and second positions; and
   a controller configured to, adjust the abutment between the first and second positions, via the actuator, based on a speed of the vehicle.

2. The vehicle of claim 1, wherein the controller is further configured to, (i) in response to a speed of the vehicle being less than a threshold, adjust the abutment to the first position via the actuator, and (ii) in response to a speed of the vehicle being greater than the threshold, adjust the abutment to the second position via the actuator.

3. The vehicle of claim 1, wherein the controller is further configured to, in response to the gear shifter being in the first or second position, the speed of the vehicle being greater than a threshold, and a brake pedal being applied, adjust the abutment to the first position via the actuator.

4. The vehicle of claim 1, wherein the controller is further configured to, in response to the speed of the vehicle being less than a threshold speed, the gear shifter being in the third or fourth position, and an accelerator pedal being applied, adjust the abutment to the second position via the actuator.

5. The vehicle of claim 1, wherein the resilient member is a compression spring connected between the movable abutment and the gear shifter.

6. The vehicle of claim 1, wherein the gear shift mechanism further includes a stationary abutment connected to the gear shifter by a second resilient member.

7. The vehicle of claim 1, wherein the gear box further includes fifth and sixth gear ratios, the gear shifter further includes fifth and sixth positions corresponding to the fifth and sixth gear ratios, and the movement path further has a third parallel plane extending between the fifth and sixth positions and the transverse plane extends to the third parallel plane, wherein the biasing mechanism is further configured to urge the gear shifter to a third neutral position located at the intersection of the third parallel plane and the transverse plane when the abutment is in a third position, and the actuator is operable to adjust the abutment between the first, second, and third positions.

8. The vehicle of claim 7, wherein the controller is further configured to, in response to the speed of the vehicle being greater than a second threshold, adjust the abutment to the third position via the actuator.

9. A vehicle comprising:
a gear shifter operable to shift a transmission and including a movable abutment;
an actuator connected to the shifter via a resilient member connected between the abutment and the actuator and actuatable to bias the shifter to a first or second neutral position;
an accelerator pedal;
a controller configured to, responsive to a vehicle speed being less than a threshold and the pedal being applied, bias the shifter to the second neutral.

10. The vehicle of claim 9, wherein the controller is further configured to, responsive to a vehicle speed being greater than the threshold, bias the shifter to the second neutral position.

11. The vehicle of claim 9 further comprising a brake pedal, wherein the controller is further configured to, responsive to a vehicle speed being greater than the threshold, bias the shifter to the second neutral position if the brake pedal is unapplied and bias the shifter to the first neutral position if the brake pedal is applied.

12. A vehicle comprising:
a gear shifter operable to shift a transmission;
an actuator connected to the shifter and actuatable to bias the shifter to a first or second neutral position;
an accelerator pedal;
a movable abutment connected to the actuator;
a resilient member connected between the abutment and the gear shifter; and
a controller configured to, responsive to a vehicle speed being less than a threshold, bias the shifter to the first neutral position if the accelerator is unapplied, and bias the shifter to the second neutral position if the accelerator is applied.

13. The vehicle of claim 12, wherein the actuator is configured to move the abutment between a first position that biases the gear shifter to the first neutral position and a second position that biases the gear shifter to the second neutral position.

14. The vehicle of claim 12 further comprising:
a fixed abutment; and
a second resilient member connected between the fixed abutment and the gear shifter.

15. The vehicle of claim 12, wherein the controller is further configured to, responsive to a vehicle speed being greater than the threshold, bias the shifter to the second neutral position.

16. The vehicle of claim 12 further comprising a brake pedal, wherein the controller is further configured to, responsive to a vehicle speed being greater than the threshold, bias the shifter to the second neutral position if the brake pedal is unapplied and bias the shifter to the first neutral position if the brake pedal is applied.

* * * * *